US007430017B2

(12) United States Patent
Lee

(10) Patent No.: US 7,430,017 B2
(45) Date of Patent: Sep. 30, 2008

(54) DEVICE FOR AUTOMATICALLY DETECTING BROADCASTING SIGNAL AND METHOD OF THE SAME

(75) Inventor: Sung-chull Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 503 days.

(21) Appl. No.: 11/082,650

(22) Filed: Mar. 18, 2005

(65) Prior Publication Data

US 2005/0206787 A1    Sep. 22, 2005

(30) Foreign Application Priority Data

Mar. 22, 2004  (KR) ............... 10-2004-0019449

(51) Int. Cl.
*H04N 5/46* (2006.01)
(52) U.S. Cl. ...................... 348/558; 348/555
(58) Field of Classification Search ............... 348/558, 348/180, 194, 505, 557, 554
See application file for complete search history.

(56) References Cited

U.S. PATENT DOCUMENTS

| 4,661,844 | A | * | 4/1987 | Rufray et al. ............... 348/557 |
| 4,688,082 | A | | 8/1987 | Kato |
| 5,136,369 | A | | 8/1992 | Bohme et al. |
| 5,192,997 | A | * | 3/1993 | Imbert et al. ............... 348/558 |
| 5,267,024 | A | * | 11/1993 | Murayama ............... 348/643 |
| 5,311,296 | A | * | 5/1994 | Ikefuji et al. ............... 348/505 |
| 5,311,301 | A | * | 5/1994 | Jae-Gyun ............... 348/453 |
| 5,570,134 | A | * | 10/1996 | Hong ............... 348/467 |
| 5,663,768 | A | | 9/1997 | Yang |
| 5,835,157 | A | * | 11/1998 | Miyazaki et al. ............ 348/558 |
| 5,953,072 | A | * | 9/1999 | Lim ............... 348/555 |
| 6,525,777 | B2 | * | 2/2003 | Kameda et al. ............. 348/555 |
| 6,765,621 | B2 | * | 7/2004 | Okada ............... 348/558 |
| 6,873,369 | B2 | * | 3/2005 | Koyama ............... 348/554 |
| 6,894,340 | B2 | * | 5/2005 | Kuo et al. ............... 257/315 |
| 2003/0001967 | A1 | | 1/2003 | Usui | |

FOREIGN PATENT DOCUMENTS

EP    0 529 442    3/1993

OTHER PUBLICATIONS

European Search Report issued with respect to European Application No. 05251699.4-2202, which corresponds to the above-referenced application.
Chinese Patent Office Action, mailed May 9, 2008 and issued in corresponding Chinese Patent Application No. 2005100762557.

* cited by examiner

*Primary Examiner*—Victor R Kostak
(74) *Attorney, Agent, or Firm*—Staas & Halsey LLP

(57) ABSTRACT

Provided are an apparatus for automatically detecting broadcasting signals and a method of the same to conveniently detect the broadcasting system of the broadcasting signals. The apparatus includes a frequency detection unit detecting a color sub-carrier frequency of the broadcasting signals, a synchronous signal separation unit separating a horizontal synchronous signal of the broadcasting signals, and a control unit determining a type of broadcasting system of the broadcasting signals using the color sub-carrier frequency and the horizontal synchronous signal.

9 Claims, 5 Drawing Sheets

DEVICE FOR AUTOMATICALLY DETECTING BROADCASTING SIGNAL AND METHOD OF THE SAME

CROSS-REFERENCE TO RELATED APPLICATION

This application claims benefit from Korean Patent Application No. 10-2004-0019449 filed on Mar. 22, 2004 in the Korean Intellectual Property Office, the disclosure of which is incorporated herein by reference in its entirety.

BACKGROUND OF THE INVENTION

1. Field of the Invention

The present invention relates to a device for automatically detecting broadcasting signals and a method used by the device, and more particularly, to a device for automatically detecting broadcasting signals and a method used by the device for conveniently detecting the broadcasting system of broadcasting signals.

2. Description of the Related Art

Various broadcasting systems are used in different countries of the world according to territorial and cultural characteristics.

Examples of broadcasting systems include the NTSC system, the PAL system, and the SECAM system.

The Radio Corporation of America (RCA) developed color television, which was compatible with black and white television, and required a standard. Thus, the national television system committee (NTSC) adopted the NTSC system as the standard used in the United States in December 1953.

In addition, the PAL system was proposed by Walter Brach of Telefunken company and adopted as a standard in West Germany, Great Britain, The Netherlands, and Switzerland. The name of the PAL system originates from "Phase Alternation by Line."

In addition, the SECAM system was proposed by Henri de France in 1957 and adopted as a standard in France, Russia, and East Germany. The name of the SECAM system originates from "sequential couleur's memories" which means sequentially memorizing color signals in each scan line.

Such broadcasting systems can be classified based on the number of scan lines, field rate, color sub-carrier frequency, and phase, as shown in Table 1.

Accordingly, an apparatus for determining the type of broadcasting system and receiving corresponding broadcasting signals based on the determination result is proposed.

A conventional method of detecting a broadcasting system is shown in FIG. 1A. Referring to FIG. 1A, in operation S1, it is determined whether broadcasting signals received through a device for receiving broadcasting signals are in the SECAM system.

In this case, the order in which determinations are made for whether different broadcasting systems are received can be changed.

In other words, a determination of whether other broadcasting systems are received can be made prior to checking for the SECAM system.

On the other hand, the SECAM system may be determined using a register of the device for receiving broadcasting signals in which a predetermined value is set according to the broadcasting system.

If the received broadcasting signals are SECAM system signals, the received broadcasting signals are determined to be SECAM system signals in operation S2. If the received broadcasting signals are signals other than a SECAM system signal, a color sub-carrier frequency of the received broadcasting signals is determined in operation S3. In this case, the color sub-carrier frequency is first used in multi-step modulation and denotes a color carrier frequency used in modulating color signals in the NTSC system.

More specifically, after performing color signal modulation and sharing a brightness signal and a frequency spectrum, a final modulation is performed using a higher frequency. In this case, the carrier wave used in the final modulation is referred to as a main carrier wave.

If the color sub-carrier frequency is 4.43 MHz, in operation S4, it is determined whether the color format of the received broadcasting signals is in the PAL system in operation S5.

If the color format of the received broadcasting signals is in the PAL system, it is determined that the received broadcasting signals are PAL system signals in operation S6. Otherwise, in operation S7 the received broadcasting signals are determined to be NTSC system signals. In this case, the order of determining the color format of the received broadcasting signals can be changed.

TABLE 1

|  | NTSC | NTSC4.43 | PAL | PAL60 | PAL-N | PAL-M | SECAM |
|---|---|---|---|---|---|---|---|
| Number of scan lines | 525 | 525 | 625 | 525 | 625 | 525 | 625 |
| Field rate | 60 | 60 | 50 | 60 | 50 | 60 | 50 |
| Color Sub-carrier frequency | 3.58 | 4.43 | 4.43 | 4.43 | 3.58 | 3.58 | For = 4.40 Fob = 4.25 |
| Phase | Fixed | Fixed | Shift | Shift | Shift | Shift | Shift |

Broadcasting systems vary from region to region and country to country, and thus, a device for receiving broadcasting signals are set to receive broadcasting signals corresponding to the region/country in which they are used.

In this case, when a device receives broadcasting signals of various broadcasting systems, an additional device for receiving the broadcasting signals of various broadcasting systems is required.

If the color sub-carrier frequency is a frequency other than 4.43 MHz, e.g., 3.58 MHz, it is determined whether the received broadcasting signals are PAL-N system signals in operation S8.

If the received broadcasting signals are PAL-N system signals, it is determined whether the color format of the received broadcasting signals is in the PAL system in operation S9.

If the color format of the received broadcasting signals is in the PAL system, the received broadcasting signals are determined to be the PAL-N system signals in operation S10.

If it is determined that the received broadcasting signals are not in the PAL-N system, the following process described with reference to FIG. 1B is performed.

If the broadcasting signals are determined to be signals other than PAL-N system signals in operation S8, it is determined whether the received broadcasting signals are in the PAL-M system in operation S14.

If the received broadcasting signals are in the PAL-M system, it is determined whether the color format of the received broadcasting signals is in the PAL system in operation S15.

If the color format of the received broadcasting signals is in the PAL system, it is determined that the received broadcasting signals are in the PAL-M system in operation S16.

If the color format of the received broadcasting signals is not in the PAL system, a first basic clock frequency for detecting the color format is incremented by a predetermined value to produce a first clock frequency in operation S17, then the color signal of the received broadcasting signals is detected in operation S18.

When the color signal is detected, the broadcasting signals are determined to be PAL-N system signals in operation S19. Otherwise, the broadcasting signals are determined to be NTSC system signals in operation S20.

Thereafter, the first clock frequency is returned to the first basic clock frequency by decreasing the first clock by a predetermined value in operation S21.

On the other hand, when the broadcasting signals are not PAL-M system signals, the color signal of the received broadcasting signals is detected in operation S22, then the broadcasting signals are determined to be PAL-N system signals in operation S23.

If the color signal is not detected in the received broadcasting signals, a second basic clock for detecting the color signal is incremented by a predetermined value to produce a second clock frequency in operation S24.

Thereafter, it is determined whether the color format of the received broadcasting signals is in the PAL system in operation S25.

When the color format of the received broadcasting signals is in the PAL system, the received broadcasting signals are determined to be PAL-N system signals Otherwise, the received broadcasting signals are determined to be NTSC system signals in operation S26.

In addition, the second clock frequency is returned to the second basic clock frequency in operation S28.

The conventional method of detecting broadcasting signals detects the broadcasting systems of various broadcasting signals using broadcasting types, color formats, and color signals that are determined based on a predetermined bit value of a register, which is set according to the received broadcasting signals.

However, such a conventional method requires complicated processes for determining the broadcasting signals, thus a time for determining the broadcasting signals is increased.

SUMMARY OF THE INVENTION

Additional aspects and/or advantages of the invention will be set forth in part in the description which follows and, in part, will be obvious from the description, or may be learned by practice of the invention.

According to an embodiment of the present invention, an apparatus for automatically detecting broadcasting signals and a method of the same may detect various broadcasting signals using a color sub-carrier frequency and a field frequency.

The above stated object as well as other objects, features and advantages, of the present invention will become clear to those skilled in the art upon review of the following description, the attached drawings and appended claims.

According to an aspect of the present invention, there is provided an apparatus for automatically detecting broadcasting signals, including a frequency detection unit detecting a color sub-carrier frequency of the broadcasting signals, a synchronous signal separation unit separating a horizontal synchronous signal of the broadcasting signals, and a control unit determining a broadcasting system of the broadcasting signals using the color sub-carrier frequency and the horizontal synchronous signal.

According to another aspect of the present invention, there is provided a method of automatically detecting broadcasting signals, including detecting color sub-carrier frequency data from the broadcasting signals, separating a horizontal synchronous signal of the broadcasting signals, and determining a broadcasting system of the broadcasting signals using the color sub-carrier frequency and the horizontal synchronous signal.

BRIEF DESCRIPTION OF THE DRAWINGS

These and/or other aspects and advantages of the invention will become apparent and more readily appreciated from the following description of the embodiments, taken in conjunction with the accompanying drawings of which.

The above and other features and advantages of the present invention will become more apparent by describing in detail exemplary embodiments thereof with reference to the attached drawings in which.

DETAILED DESCRIPTION OF THE PREFERRED EMBODIMENTS

Figure 1A:
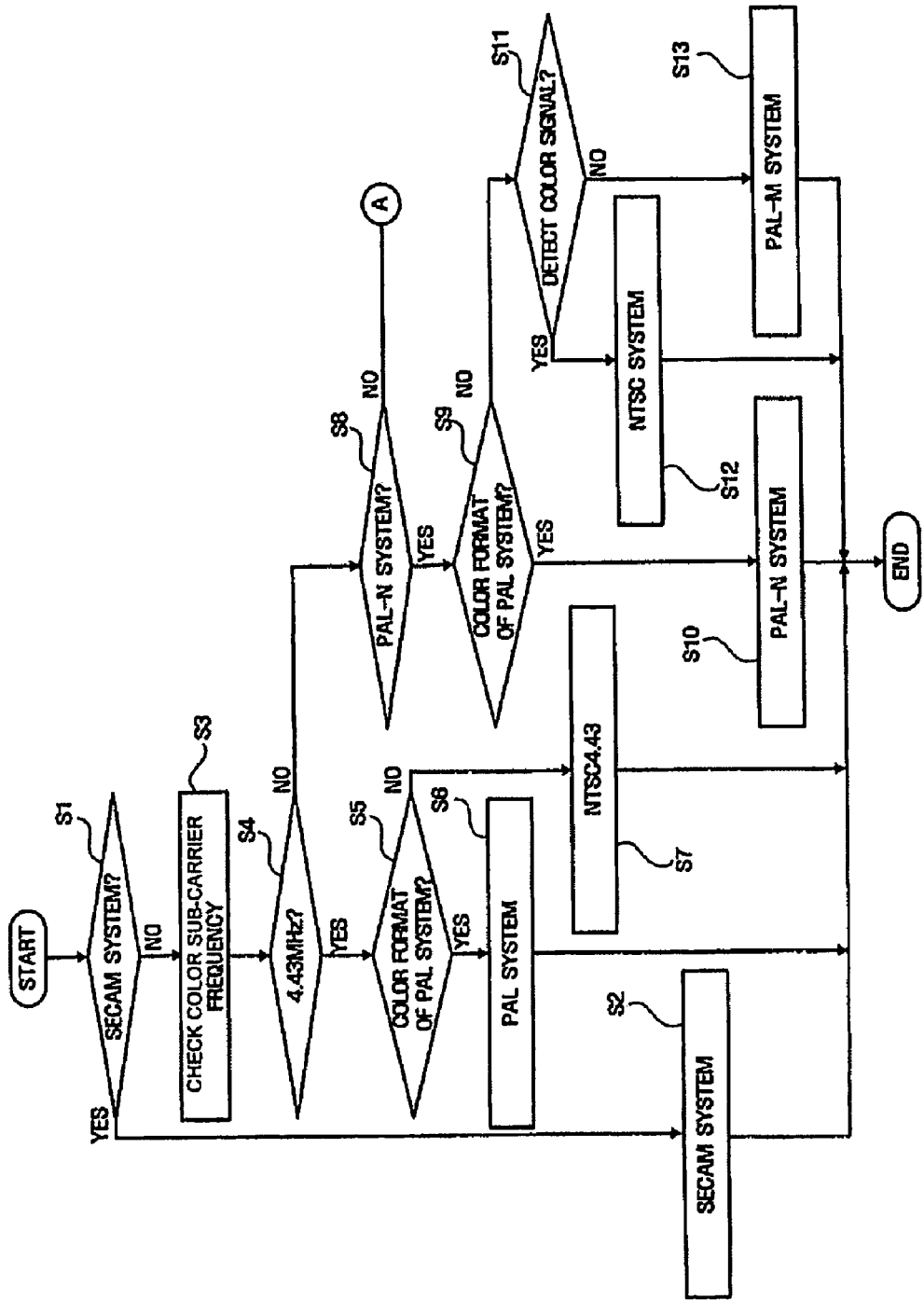
FIG. 1A is a flowchart illustrating a first conventional method of detecting broadcasting signals.
Figure 1B:
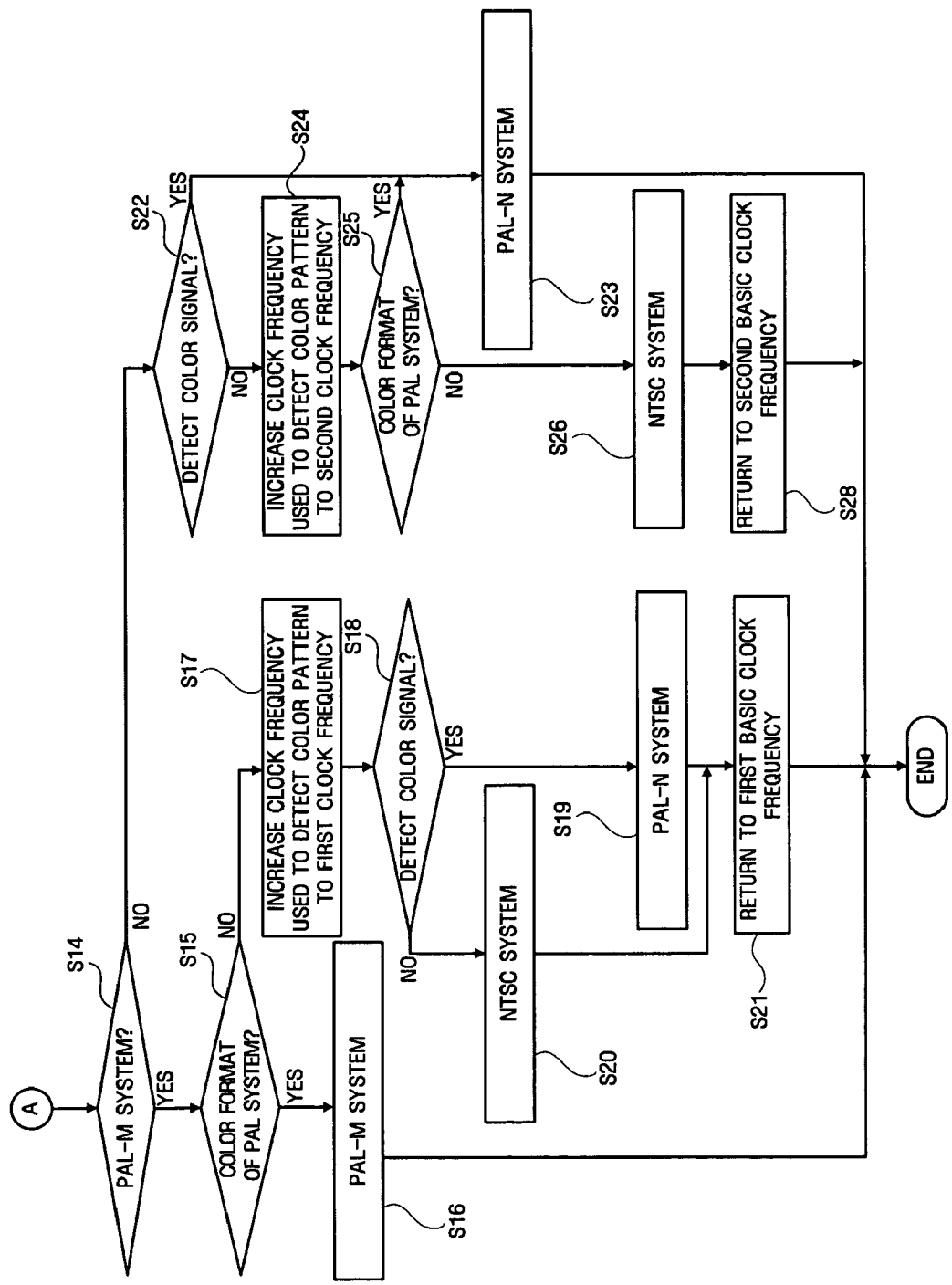
FIG. 1B is a flowchart illustrating a second conventional method of detecting broadcasting signals.

Reference will now be made in detail to the embodiments of the present invention, examples of which are illustrated in the accompanying drawings, wherein like reference numerals refer to the like elements throughout. The embodiments are described below to explain the present invention by referring to the figures.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Figure 2:
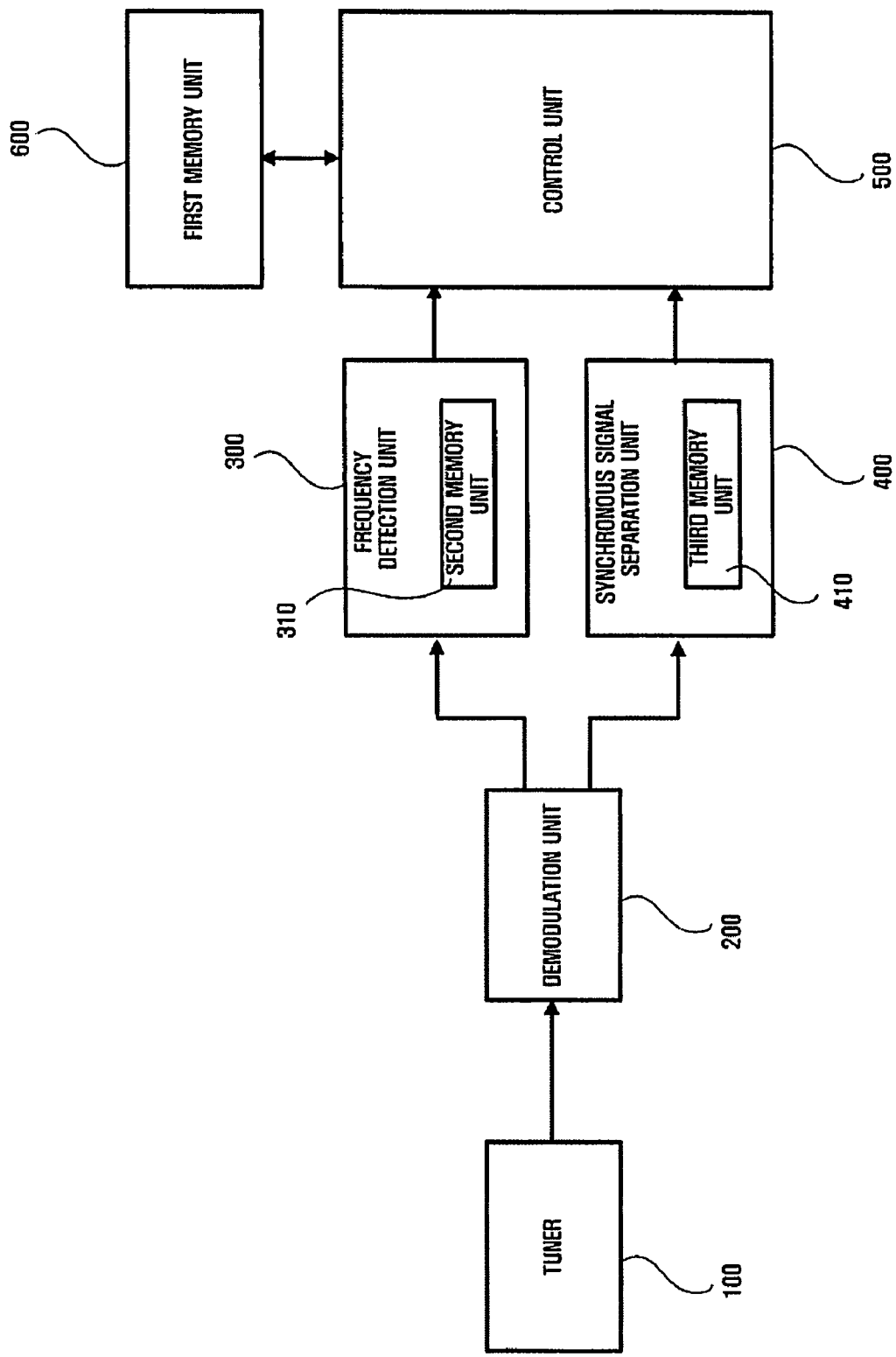
FIG. 2 is a block diagram of a device for automatically detecting broadcasting signals according to an embodiment of the present invention.

FIG. 2 is a block diagram of an apparatus for automatically detecting broadcasting signals according to an embodiment of the present invention.

Referring to FIG. 2, an apparatus for automatically detecting broadcasting signals includes a tuner 100 receiving a predetermined broadcasting signal, a demodulation unit 200 demodulating the received broadcasting signal, a frequency detection unit 300 detecting a sub-carrier wave frequency of the demodulated broadcasting signal, a synchronous signal separation unit 400 separating a horizontal synchronous signal from the demodulated broadcasting signal, and a control unit 500 determining a broadcasting system of the broadcasting signal using the color sub-carrier frequency and the horizontal synchronous signal.

The synchronous signal separation unit 400 generates the field frequency by counting the number of cycles of the horizontal synchronous signal during predetermined frames.

The synchronous signal separation unit 400 determines the field frequency may be 60 Hz when the number of cycles of the horizontal synchronous signal is 525, and determines the field frequency may be 50 Hz when the number of cycles of the horizontal synchronous signal is 625.

In addition, the apparatus for automatically detecting the broadcasting signals according to the embodiment of the present invention further includes a first memory unit 600 storing a color sub-carrier frequency data and the field frequency data for each broadcasting system.

In this case, the frequency detection unit 300 includes a second memory unit 310 storing the detected color sub-carrier frequency data.

Further, the synchronous signal separation unit 400 includes a third memory unit 410 storing the image frequency data.

The first, second, and third memory units 600, 310, and 410 may include cache memory, ROM, PROM, EPROM, EEPROM, flash, SRAM, and/or DRAM.

In addition, the first memory unit 610, the second memory unit 310, and the third memory unit 410 may be separated from one another. Otherwise, the first, second, third memory units 600, 310, and 410 may be separated from one another in a software manner, but integrally formed in a hardware manner.

The control unit 500 compares at least one of the color sub-carrier frequency data stored in the second memory unit 310 and the image frequency data stored in the third memory unit 410 with the color sub-carrier frequency data and the image frequency data stored in the first memory unit 600 in order to determine the broadcasting system of the broadcasting signals received by the tuner 100.

In other words, the control unit 500 determines the broadcasting system of the received broadcasting signals using the color sub-carrier frequency data, or the color sub-carrier frequency data and the field frequency data.

In addition, the control unit 500 may change the setting of an apparatus for receiving the broadcasting signal based on the determined broadcasting system for the apparatus to receive the broadcasting signal.

Such an apparatus for automatically detecting the broadcasting signals according to the embodiment of the present invention may be used separately from a receiving device receiving the broadcasting signals, such as a television, or a personal video recorder, a set-top box or a DVD player, or may be included in such a receiving device.

An operation of the apparatus for automatically detecting the broadcasting signals according to the embodiment of the present invention will now be described.

Figure 3A:
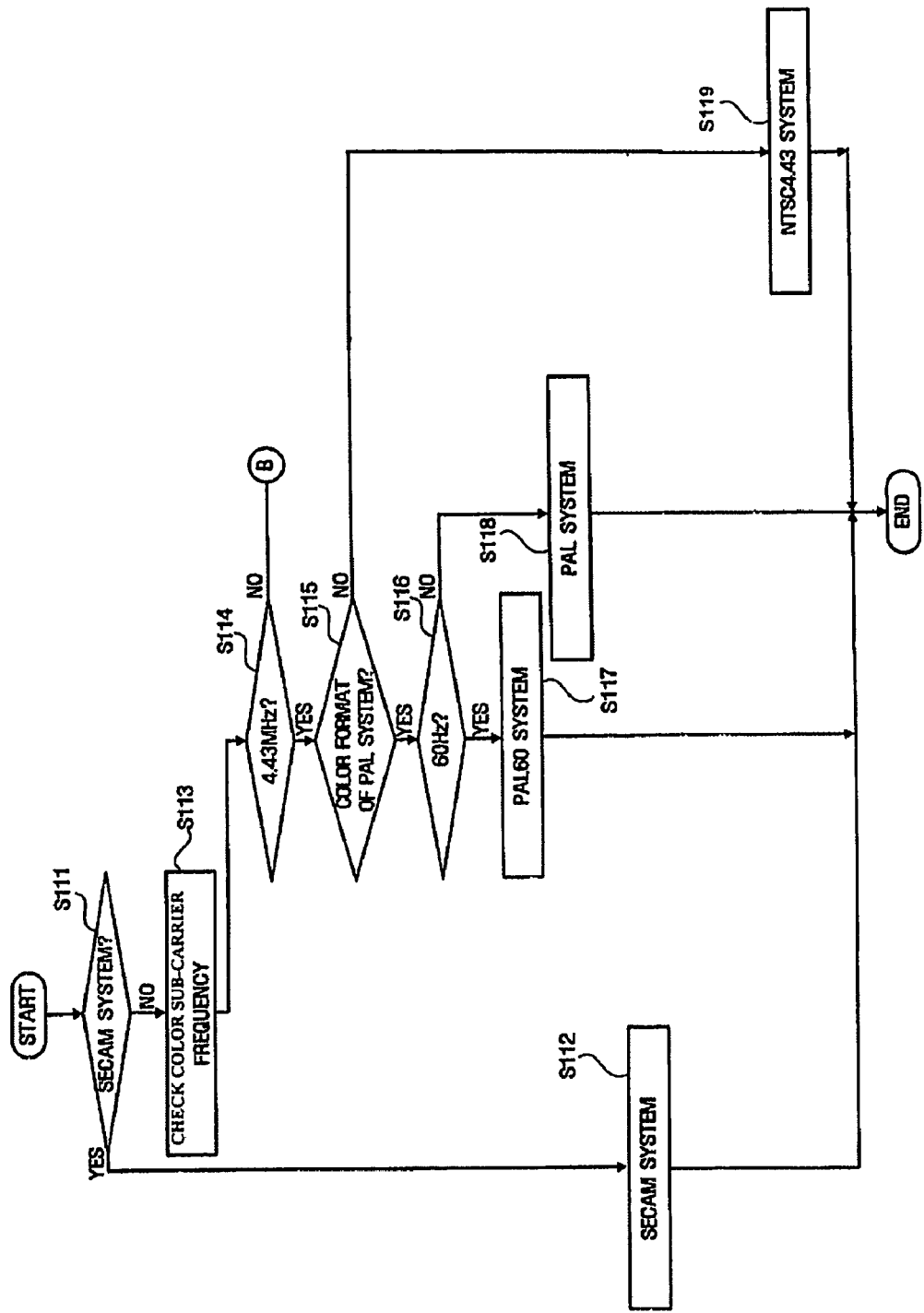
FIG. 3A is a flowchart illustrating a method of automatically detecting broadcasting signals according to an embodiment of the present invention.

FIG. 3A is a flowchart of a method of automatically detecting a broadcasting signal according to an embodiment of the present invention. Referring to FIG. 3A, in operation S111 it is determined whether the broadcasting system of broadcasting signals, which are received by the tuner 100 and demodulated in the demodulation unit 200, is a SECAM system signal.

According to an embodiment of the present invention, it is first determined whether the broadcasting signals are in the SECAM system; however, the order of determining the broadcasting systems may be changed.

When the broadcasting system of the broadcasting signals is the SECAM system signal, the control unit 500 sets a device to receive the broadcasting signals in the SECAM system in operation S112.

When the broadcasting system of the broadcasting signals is a system signal other than the SECAM system signal, the control unit 500 detects the color sub-carrier frequency of the broadcasting system in operation S113.

In other words, the control unit 500 detects the color sub-carrier frequency of the received broadcasting signals from the second memory unit 310, which stores the color sub-carrier frequency data detected by the frequency detection unit 300.

The control unit 500 determines whether the color sub-carrier frequency is 4.43 MHz in operation S114, and if so, determines whether the color pattern of the received broadcasting signals is the color pattern of the PAL system in operation S115.

In other words, the control unit 500 compares the color sub-carrier frequency data from the second memory unit 310 with the color sub-carrier frequency data of each broadcasting system stored in the first memory unit 600.

In the description of the present invention, the cases having color sub-carrier frequencies of 4.43 MHz and 3.58 MHz are described.

The color pattern data may be stored in a predetermined memory according to the data included in the broadcasting signals, which are demodulated in the demodulation unit 200.

The color pattern data may be stored in the first memory unit 600, the second memory unit 310, and the third memory unit, or a separately arranged memory. For example, Table 2 denotes the color pattern data and the color signal data stored in an 8-bit data frame.

TABLE 2

| index | Mnemonic | bit7   | bit6   | bit5   | bit4  | bit3     | bit2         | bit1         | bit0  |
|-------|----------|--------|--------|--------|-------|----------|--------------|--------------|-------|
| 00h   | STAT     | CHIPID | VBIFLG | NOVID  | reserved | color format | color signal | HLOCK | CLOCK |

In Table 2, bit3 and bit2 store the color format and the color signal, respectively; however, other bits may store the color format and the color signal.

If the color pattern is in the PAL system, the control unit 500 determines whether the field frequency of the received broadcasting signals is 60 Hz in operation S116.

In other words, the control unit 500 may compare the field frequency data stored in the third memory unit 410 with the image frequency data for each broadcasting system stored in the first memory unit 600.

In the illustrative embodiment of the present invention, the cases having field frequencies of 50 Hz and 60 Hz are described.

If the field frequency is 60 Hz, the broadcasting system of the received broadcasting signals can be the PAL60 system in operation S117. Otherwise, the broadcasting system of the received broadcasting signals may be the PAL system in operation S118.

If the color pattern of the broadcasting signals is a system other than the PAL system, the control unit 500 determines whether the field frequency of the broadcasting signals is NTSC 4.43 System signal in operation S119.

Figure 3B:
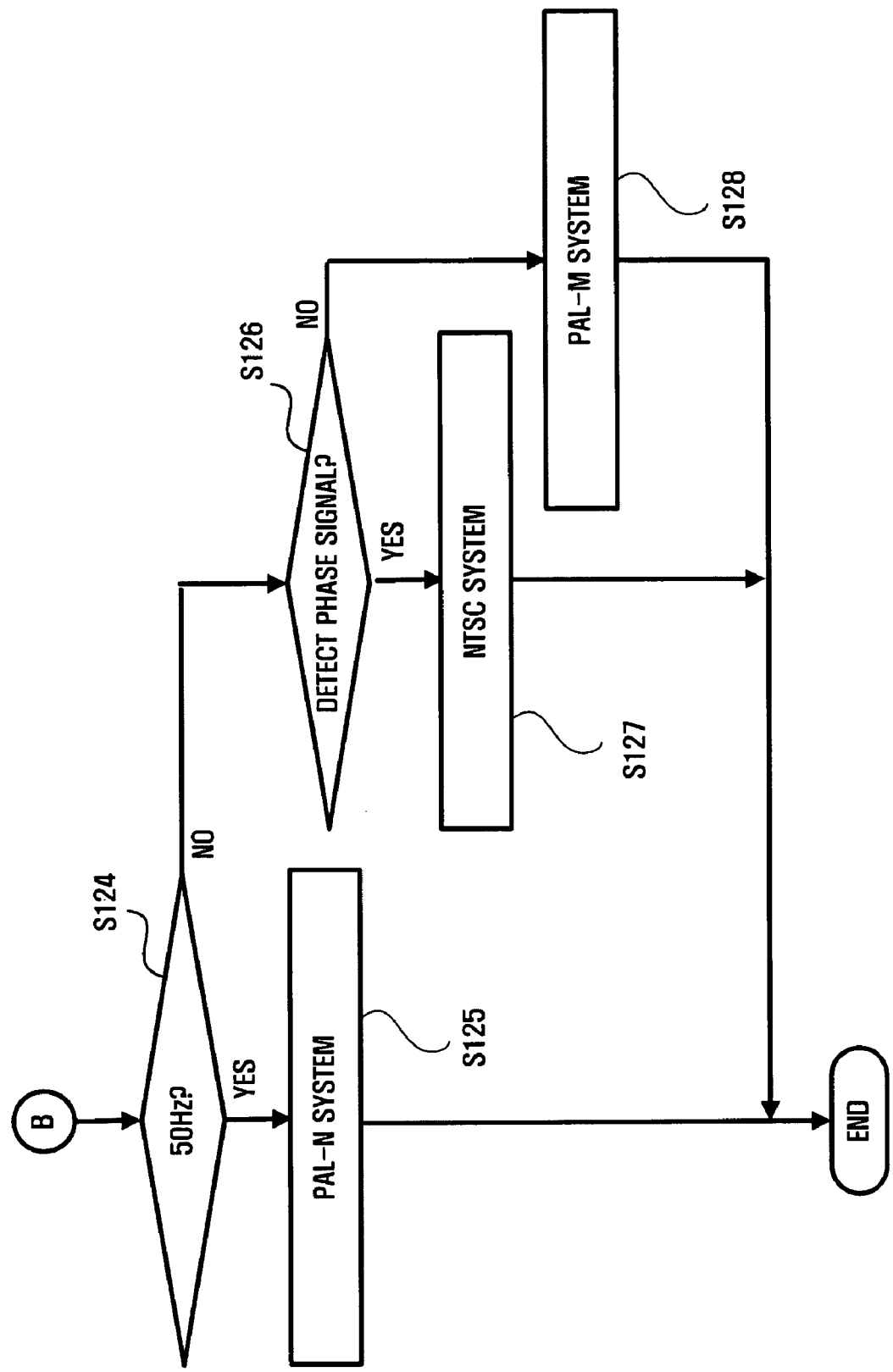
FIG. 3B is a flowchart illustrating a method of automatically detecting broadcasting signals according to another embodiment of the present invention.

A method of detecting the broadcasting signals having the color sub-carrier frequency of 3.58 MHz will now be described with reference to FIG. 3B.

If the color sub-carrier frequency of the broadcasting signals is a frequency other than 4.43 MHz, the control unit 500 determines whether the field frequency of the broadcasting signals is 50 Hz in operation S124.

If the field frequency of the broadcasting signals is 50 Hz, the control unit 500 determines the broadcasting system of the broadcasting signals to be the PAL-N system in operation S125.

Otherwise, the control unit 500 detects whether a phase signal data is detected from the broadcasting signals in operation S126.

In this embodiment, it will be assumed by way of example that a color signal is detected through bit 2 (color signal) of Table 2 described above. Also in this embodiment, the phase signal may be detected from Table 1 described above. If a phase signal is detected, the control unit 500 determines the broadcasting system of the broadcasting signals to be the NTSC system in operation S127. Otherwise, the control unit 500 determines the broadcasting system of the broadcasting signals to be the PAL-M system in operation S128.

While the present invention has been particularly shown and described with reference to exemplary embodiments thereof, it will be understood by those of ordinary skill in the art that various changes in form and details may be made therein without departing from the spirit and scope of the present invention as defined by the following claims.

According to an aspect of the present invention, processes for determining a broadcasting system of various broadcasting signals are simplified to reduce a time for determining the broadcasting system.

In addition, since the type of broadcasting system is determined based on the image frequency data of the broadcasting signals, the utility of the data is improved. Although a few embodiments of the present invention have been shown and described, it would be appreciated by those skilled in the art that changes may be made in these embodiments without departing from the principles and spirit of the invention, the scope of which is defined in the claims and their equivalents.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of automatically detecting broadcasting signals, the method comprising:
    detecting color sub-carrier frequency data from the broadcasting signals;
    separating a horizontal synchronous signal of the broadcasting signals after the detecting color sub-carrier frequency data; and
    determining a type of broadcasting system of the broadcasting signals using the color sub-carrier frequency and the horizontal synchronous signal after the separating a horizontal synchronous signal of the broadcasting signals,
    wherein the detecting the color sub-carrier frequency data further includes storing the detected color sub-carrier frequency data.

2. The method of claim 1, wherein separating the horizontal synchronous signal includes:
    generating an field frequency, which counts the number of cycles of the horizontal synchronous signal occurring in a frame of a predetermined size; and
    storing the field frequency data.

3. The method of claim 2, further comprising storing the color sub-carrier frequency data and the field frequency data of each broadcasting system, before detecting the color sub-carrier frequency data.

4. The method of claim 3, wherein the determining of the type of broadcasting system of the broadcasting signals comprises comparing at least one of the color sub-carrier frequency and the field frequency with the color sub-carrier frequency data and the field frequency data of each broadcasting system.

5. A method of detecting broadcasting signals, the method comprising:
    checking whether the broadcasting signal is SECAM system signal; and
    receiving the broadcasting signal in the SECAM system signal, if the broadcasting signal is SECAM system signal;
    detecting a color sub-carrier frequency from the broadcasting signals after the checking whether the broadcasting signal is SECAM system signal;
    detecting a field frequency of the broadcasting signals after the detecting a color sub-carrier frequency;
    detecting a color format signal after detecting a field frequency of the broadcasting signals; and
    determining a type of broadcasting system of the broadcasting signals using the color sub-carrier frequency, the field frequency, and the color format signal.

6. The method of detecting broadcasting signal according to claim 5 further comprising:
    checking whether the color sub-signal frequency is 4.43MHz;
    checking whether the color format signal is a PAL system color format signal, if the color sub-signal frequency is 4.43MHz; and
    determining the broadcasting signal is NTSC 4.43 system signal, when the color sub-signal frequency is not the PAL system color format signal.

7. The method of detecting broadcasting signal according to claim 6, further comprising:
    checking whether the field frequency is 60Hz;
    determining the broadcasting signal is PAL6O system signal, if the field frequency is 60Hz; and determining the broadcasting signal is PAL system signal, if the field frequency is not 60Hz.

8. The method of detecting broadcasting signal according to claim 6, further comprising:
- checking whether the field frequency is 50 Hz; if the color sub-carrier is not 4.43 MHz; and
- determining the broadcasting signal is PAL-N system signal, if the field frequency signal is 50 Hz.

9. The method of detecting broadcasting signal according to claim 8, further comprising:
- detecting a color signal, if the field frequency is not 50 Hz; and
- determining the broadcasting signal is an NTSC system signal, if the color signal is detected, otherwise the broadcasting signal is a PAL-M system signal.

* * * * *

UNITED STATES PATENT AND TRADEMARK OFFICE
CERTIFICATE OF CORRECTION

| | | |
|---|---|---|
| PATENT NO. | : 7,430,017 B2 | Page 1 of 1 |
| APPLICATION NO. | : 11/082650 | |
| DATED | : September 30, 2008 | |
| INVENTOR(S) | : Sung-chull Lee | |

It is certified that error appears in the above-identified patent and that said Letters Patent is hereby corrected as shown below:

Column 8, Line 54, change "claim 5" to --claim 5,--.

Column 8, Line 66, change "PAL6O" to --PAL60--.

Signed and Sealed this

Twenty-third Day of December, 2008

JON W. DUDAS
*Director of the United States Patent and Trademark Office*